US012753864B2

(12) United States Patent
Wu

(10) Patent No.: US 12,753,864 B2
(45) Date of Patent: Oct. 6, 2026

(54) VALVE CONNECTOR

(71) Applicant: Co-Luck Enterprise Co., Ltd., Taichung City (TW)

(72) Inventor: Scott Wu, Taichung City (TW)

(73) Assignee: CO-LUCK ENTERPRISE CO., LTD., Taichung City (TW)

( * ) Notice: Subject to any disclaimer, the term of this patent is extended or adjusted under 35 U.S.C. 154(b) by 0 days.

(21) Appl. No.: 19/097,608

(22) Filed: Apr. 1, 2025

(65) Prior Publication Data

US 2025/0305602 A1 Oct. 2, 2025

(30) Foreign Application Priority Data

Apr. 1, 2024 (TW) ................................. 113112390
Jun. 24, 2024 (TW) ................................. 113123386

(51) Int. Cl.

| | |
|---|---|
| ***F16L 19/02*** | (2006.01) |
| ***F16K 15/20*** | (2006.01) |
| ***F16K 24/04*** | (2006.01) |
| ***F16K 24/06*** | (2006.01) |

(52) U.S. Cl.

CPC .......... *F16L 19/0218* (2013.01); *F16K 15/20* (2013.01); *F16K 24/04* (2013.01); *F16K 24/06* (2013.01)

(58) Field of Classification Search

CPC ...... F16L 19/0218; F16K 15/20; F16K 24/04; F16K 24/06

USPC .......................................................... 137/231

See application file for complete search history.

(56) References Cited

U.S. PATENT DOCUMENTS

| | | | | |
|---|---|---|---|---|
| 2,322,877 A * | 6/1943 | Parker | F16L 37/23 251/149.6 |
| 2021/0180717 A1* | 6/2021 | Wu | F16L 33/24 |

FOREIGN PATENT DOCUMENTS

| | | |
|---|---|---|
| CN | 106151613 A | 11/2016 |
| CN | 208670171 U | 3/2019 |
| TW | M492986 U | 1/2015 |
| TW | M600814 U | 9/2020 |
| TW | M602589 U | 10/2020 |
| TW | I748884 B | 12/2021 |

* cited by examiner

*Primary Examiner* — John Bastianelli
(74) *Attorney, Agent, or Firm* — Muncy, Geissler, Olds & Lowe, P.C.

(57) ABSTRACT

A valve connector includes a body having a first end adapted to attach to an American valve, a second end opposite the first end, and a through hole extending through both ends. A shoulder portion divides the through hole into a first accommodating portion and a second accommodating portion, with a sealing ring disposed on the second accommodating portion. A control member is movably disposed in relation to the body between a first and second position. The control member includes a body portion, a guiding hole, an abutting end, and a control end adapted to communicate with an air pump device. A venting portion is arranged between the abutting end and the control end, having a first cross-sectional area smaller than a second cross-sectional area.

9 Claims, 11 Drawing Sheets

VALVE CONNECTOR

BACKGROUND OF THE INVENTION

The present invention relates to a valve connector and, more particularly, to a valve connector that can prevent air leakage when attaching to or detaching from a valve.

Conventional valve connectors for air pumps inevitably experience brief air leakage when attaching to or detaching from a valve. More specifically, after inflating an object to a desired air pressure level, the user needs to detach the valve connector from the valve of the inflatable object. However, once the valve connector is removed, the sealing washer inside the connector fails to seal the periphery of the valve. At this moment, the actuating member of the connector still depresses the pin of valve to open the valve causing air to escape. As a result, the actual air pressure inside the inflatable object becomes lower than the intended pressure, making it difficult to achieve precise inflation.

SUMMARY OF THE INVENTION

The invention provides a valve connector, which includes a body and a control member. The body has a first end adapted to attach to an American valve, also known as a Schrader valve, a second end opposite to the first end, and a through hole extending through the first end and the second end. A shoulder portion is formed on an inner surface of the through hole to divide the through hole into a first accommodating portion and a second accommodating portion. A sealing ring is disposed on an inner surface of the second accommodating portion of the through hole. The control member is axially movable in relation to the body between a first position and a second position. The control member includes a body portion and a guiding hole formed in the body portion and communicating with the through hole. One end of the body portion forms an abutting end, and the other end of the body portion forms a control end exposed at the second end and adapted to communicate with an air pump device. The guiding hole provides an air passage between the abutting end and the control end to allow air communication between the through hole and the air pump device. The body portion has a venting portion arranged between the abutting end and the control end. The venting portion has a first cross-sectional area at an end thereof adjacent to the abutting end less than a second cross-sectional area at an end thereof away from the abutting end. When the control member is in the first position, the sealing ring is disposed between the venting portion and the control end and abuts against an outer surface of the body portion, the abutting end passes through the annular shoulder and enters the first accommodating portion to abut against a valve core of the American valve. When the control member is in the second position, the sealing ring is disposed between the venting portion and the abutting end and is separated from the outer surface of the body portion, the abutting end exits the first accommodating portion.

In an example, the through hole has a first threaded portion formed on an inner surface of the first accommodating portion. The body portion has a second threaded portion formed on the outer surface thereof and engaged with the first threaded portion, causing an axial displacement between the control member and the body when the control end is rotated.

In an example, the through hole has an internal thread formed on an inner surface of the first accommodating portion and adapted to engage with an external thread of the American valve. An annular groove is provided on one side of the first accommodating portion adjacent to the shoulder portion. A sealing ring is disposed in the annular groove to abut against the American valve.

In an example, the through hole has an annular channel on the inner surface of the second accommodating portion. The sealing ring is disposed in the annular channel and configured to prevent air leakage from the second end of the body during inflation.

In an example, the body portion has a connecting hole formed at the control end and communicating with the guiding hole. The connecting hole is adapted to connect with a connecting member configured to attach to a hose of the air pump device.

In an example, the body portion is further provided with an accommodating groove and a sealing portion in the connecting hole. The connecting member is provided with a flange formed on an outer surface thereof and between the accommodating groove and the sealing portion. A fastener is disposed in the accommodating groove to abut against the flange. A sealing ring is disposed on the outer surface of the connecting member to abut against the sealing portion.

In an example, the body is provided with a first anti-slip portion having patterns on an outer surface thereof. The control member is provided with a second anti-slip portion having patterns on an outer surface of the control end of the body portion.

In an example, the venting portion is conical, with a first diameter at an end adjacent to the abutting end being smaller than a second diameter at an end away from the abutting end.

In another example, the venting portion includes at least one venting recess formed on the end of the body portion adjacent to the abutting end. The least one venting recess is spaced from the inner surface of the second accommodating portion.

The invention provides another valve connector includes a body and a control member.

The body has a first end adapted to attach to an American valve, a second end opposite to the first end, and a through hole extending through the first end and the second end. A shoulder portion is formed on an inner surface of the through hole to divide the through hole into a first accommodating portion and a second accommodating portion. A venting portion is disposed on an inner surface of the second accommodating portion. The venting portion has a first diameter at an end thereof adjacent to the shoulder portion less than a second diameter at an end thereof away from the shoulder portion. The control member is axially movable in relation to the body between a first position and a second position. The control member includes a body portion and a guiding hole formed in the body portion and communicating with the through hole. One end of the body portion forms an abutting end, and the other end of the body portion forms a control end exposed at the second end and adapted to communicate with an air pump device. The guiding hole provides an air passage between the abutting end and the control end to allow air communication between the through hole and the air pump device. A sealing ring is disposed between the abutting end and the control end of the body portion. When the control member is in the first position, the sealing ring is disposed between the venting portion and the second end and is separated from the inner surface of the second accommodating portion, and the abutting end exits the first accommodating portion. When the control member is in the second position, the sealing ring is disposed between the venting portion and the shoulder portion and abuts against the inner surface of the second accommodating portion, and the abutting end passes through the shoulder portion and enters the first accommodating portion to abut against a valve core of the American valve.

In an example, the through hole has a first threaded portion formed on an inner surface of the first accommodating portion. The body portion has a second threaded portion formed on an outer surface thereof and engaged with the first threaded portion, causing an axial displacement between the control member and the body when the control end is rotated.

In an example, the through hole has an internal thread formed on an inner surface of the first accommodating portion and adapted to engage with an external thread of the American valve. An annular groove is provided on one side of the first accommodating portion adjacent to the shoulder portion. A sealing ring is disposed in the annular groove to abut against the American valve.

In an example, the body portion has an annular channel formed between the abutting end and the control end. The sealing ring is disposed in the annular channel.

In an example, the body portion has a connecting hole formed at the control end and communicating with the guiding hole. The connecting hole is adapted to connect with a connecting member configured to attach to a hose of an air pump device.

In an example, the body portion is further provided with an accommodating groove and a sealing portion in the connecting hole. The connecting member is provided with a flange formed on an outer surface thereof and between the accommodating groove and the sealing portion. A fastener is disposed in the accommodating groove to abut against the flange. A sealing ring is disposed on an outer surface of the connecting member to abut against the sealing portion.

In an example, the body is provided with a first anti-slip portion having patterns on an outer surface thereof. The control member is provided with a second anti-slip portion having patterns on an outer surface of the control end of the body portion.

The present invention will become clearer in light of the following detailed description of illustrative embodiments of this invention described in connection with the drawings.

DETAILED DESCRIPTION OF THE INVENTION

Figure 1:
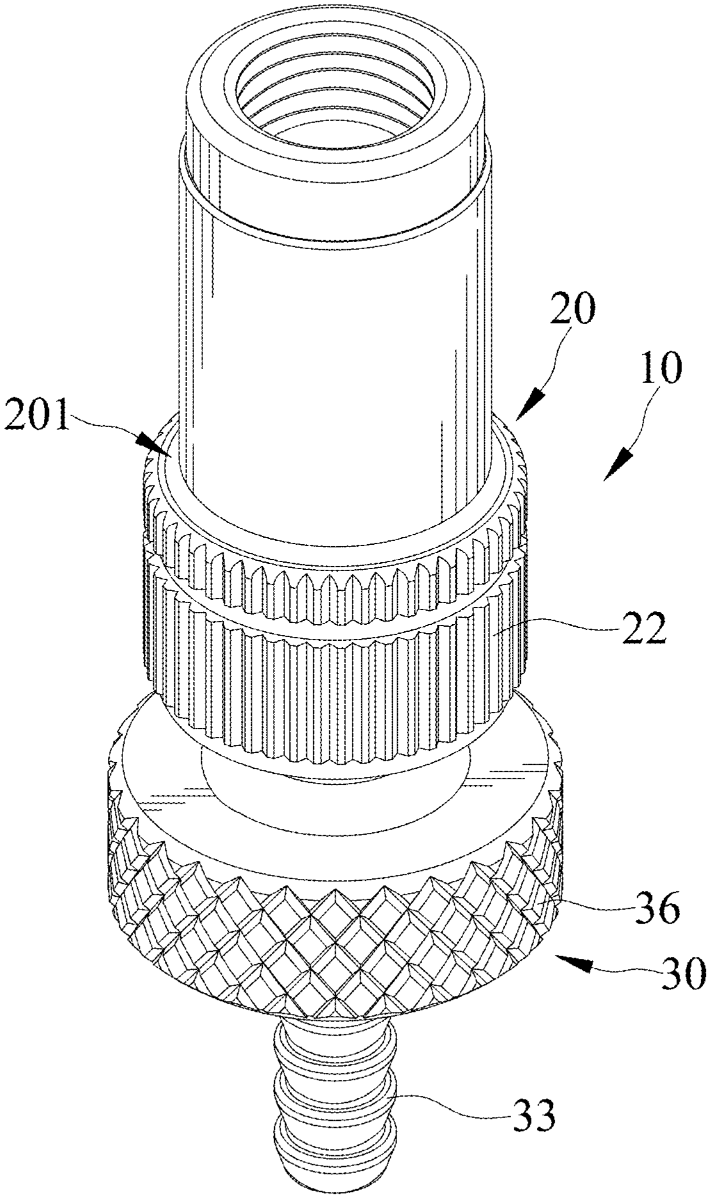
FIG. 1 is a perspective view of a valve connector of a first embodiment according to the present invention.
Figure 2:
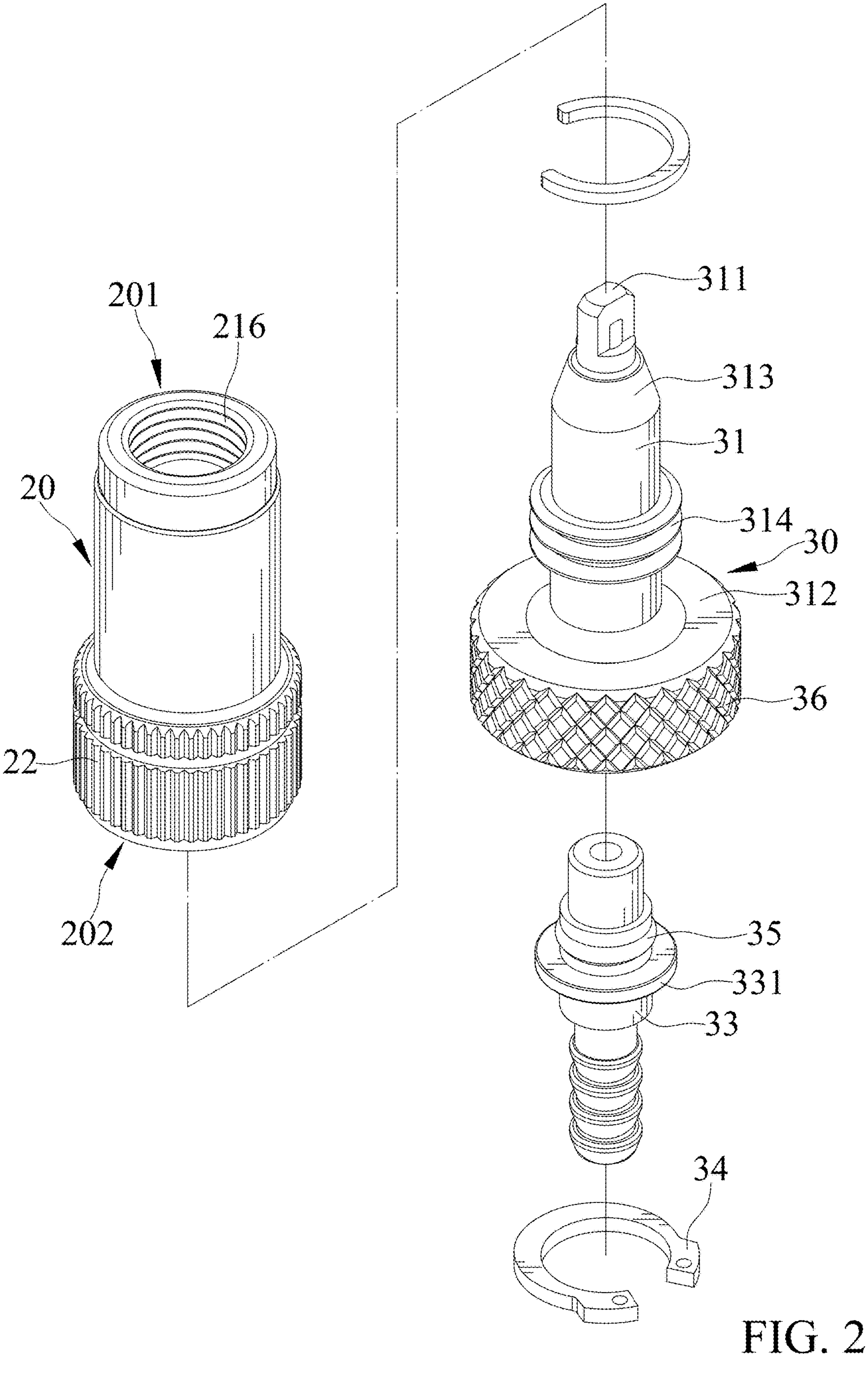
FIG. 2 is an exploded perspective view of the valve connector of FIG. 1.
Figure 3:
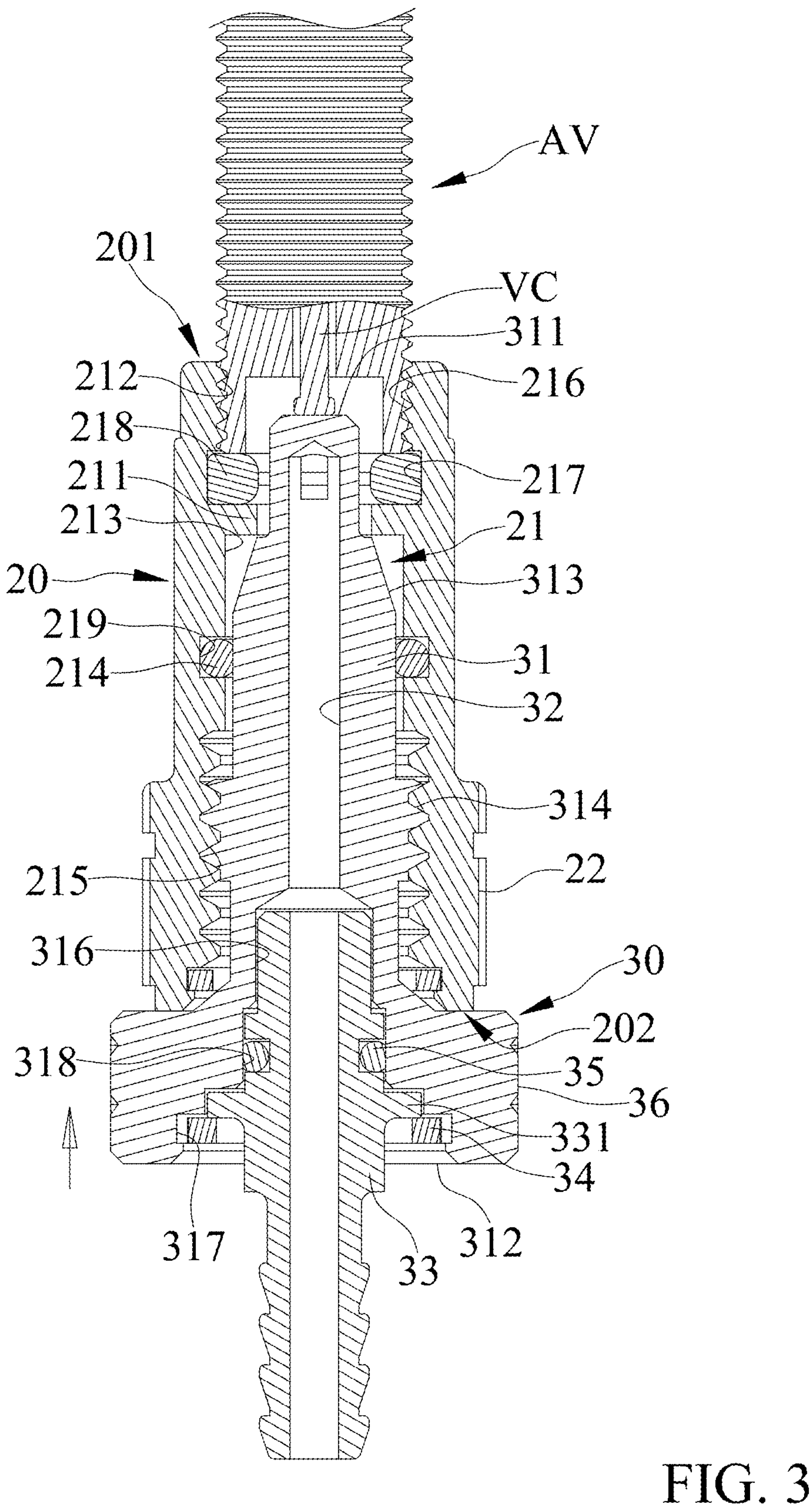
FIG. 3 is a cross-sectional view of the valve connector of FIG. 1, showing a control member in a first position.
Figure 4:
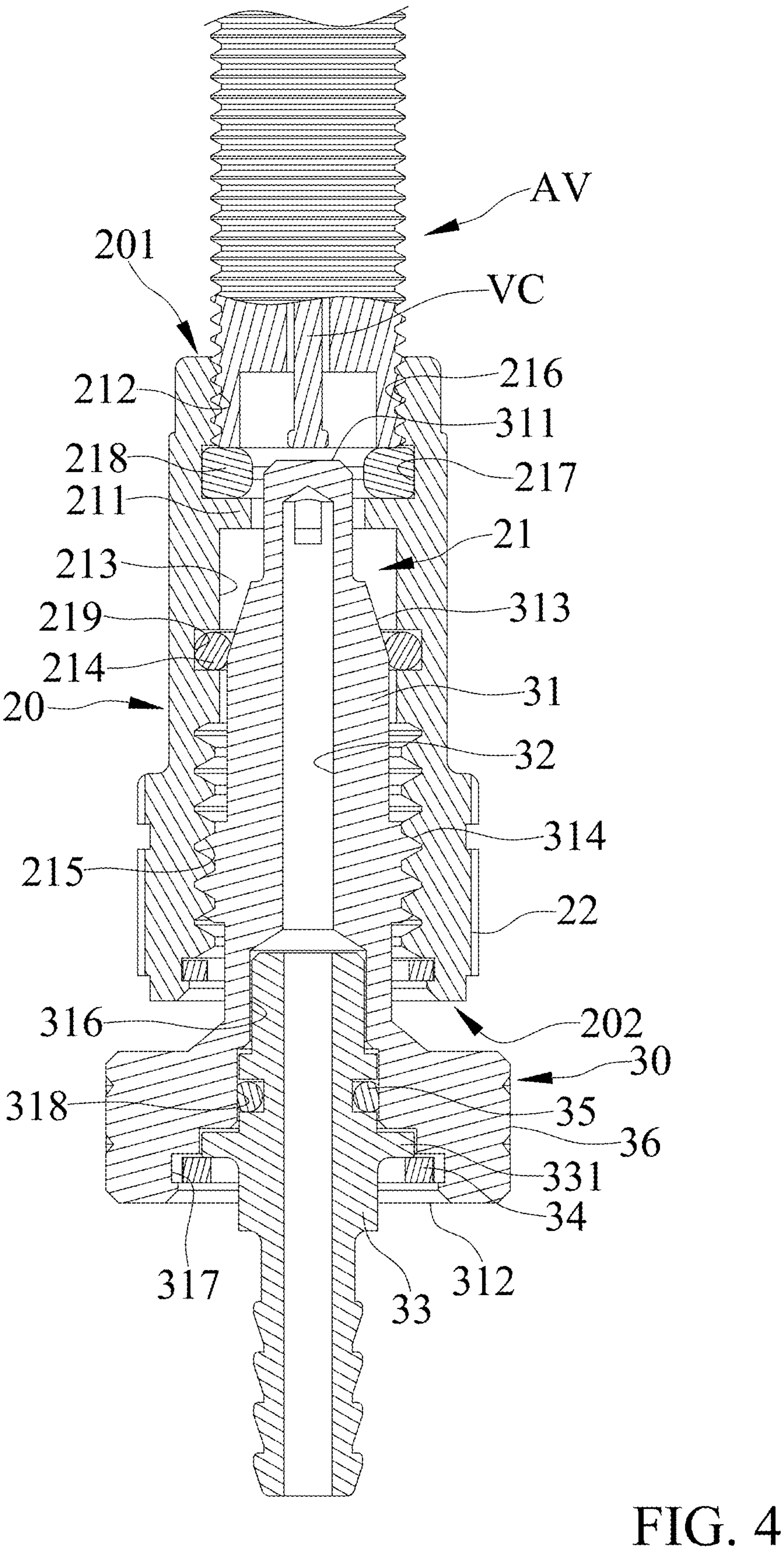
FIG. 4 is a cross-sectional view of the valve connector of FIG. 1, showing the control member between the first position and a second position.
Figure 5:
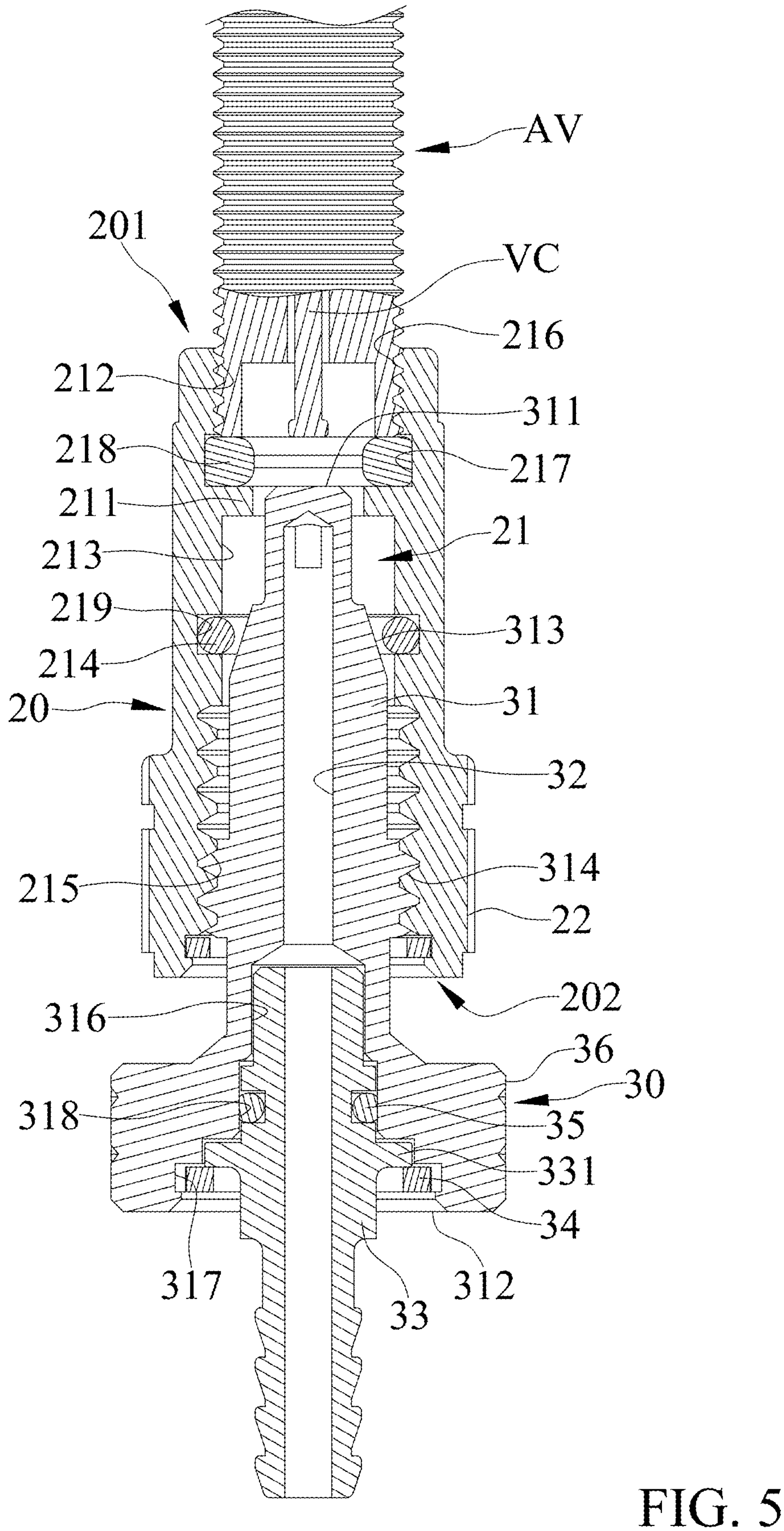
FIG. 5 is a cross-sectional view of the valve connector of FIG. 1, showing the control member in the second position.

Referring to FIGS. 1 to 5, a first embodiment of a valve connector 10 according to the present invention is shown in a perspective view, an exploded perspective view, and cross-sectional views. The valve connector 10 includes a body 20 and a control member 30 movably disposed relative to the body 20, wherein:

The body 20 has a first end 201 adapted to attach to an American valve AV, a second end 202 opposite to the first end 201, and a through hole 21 extending through the first end 201 and the second end 202. A shoulder portion 211 is formed on an inner surface of the through hole 21 to divide the through hole 21 into a first accommodating portion 212 and a second accommodating portion 213. A sealing ring 214 is disposed on an inner surface of the second accommodating portion 213.

The control member 30 is movable in relation to the body 20 to generate an axial displacement relationship between a first position and a second position. The control member 30 includes a body portion 31 and a guiding hole 32 formed in the body portion 31 and communicating with the through hole 21. One end of the body portion 31 forms an abutting end 311, and the other end forms a control end 312 exposed at the second end 202 and adapted to attach to an air pump device (not shown). The guiding hole 32 provides an air passage between the abutting end 311 and the control end 312 and is adapted to communicate the through hole 21 with the air pump device. A venting portion 313 is formed between the abutting end 311 and the control end 312. The venting portion 313 has a first cross-sectional area at an end thereof adjacent to the abutting end 311 less than a second cross-sectional area at an end thereof away from the abutting end 311. In the embodiment, the venting portion 313 has a first diameter at an end adjacent to the abutting end 311 less than a second diameter at an end away from the abutting end 311.

When the control member 30 is in the first position, the sealing ring 214 is disposed between the venting portion 313 and the control end 312 and abuts against an outer surface of the body portion 31. The abutting end 311 passes through the shoulder portion 211 and enters the first accommodating portion 212 to abut against a valve core VC of the American valve AV.

When the control member 30 is in the second position, the sealing ring 214 is disposed between the venting portion 313 and the abutting end 311 and is separated from the outer surface of the body portion 31, thereby allowing the abutting end 311 to exit the first accommodating portion 212.

To allow the control member 30 to be rotatably disposed within the second end 202 and axially displaced relative to the body 20, a first threaded portion 215 is formed on an inner surface of the first accommodating portion 212. A second threaded portion 314 is formed on an outer surface of the body portion 31 and engages the first threaded portion 215, causing the axial displacement between the control member 30 and the body 20 when the control end 312 is rotated.

To enable the first end 201 of the body 20 to securely attach to the American valve AV, an internal thread 216 is formed on an inner surface of the first accommodating portion 212 and is adapted to engage an external thread of the valve body of the American valve AV. An annular groove

217 is provided on one side of the first accommodating portion 212 adjacent to the shoulder portion 211, wherein a sealing ring 218 is disposed in the annular groove 217 to abut against the American valve AV to prevent air leakage.

To prevent air leakage from the second end 202 of the body 20 during inflation, an annular channel 219 is formed on an inner surface of the second accommodating portion 213, and the sealing ring 214 is disposed in the annular channel 219.

Additionally, to allow the air pump device to connect to the control end 312, a connecting hole 316 is formed at the control end 312 and communicates with the guiding hole 32. The connecting hole 316 is adapted to receive a connecting member 33 configured to attach to a hose of the air pump device. The body portion 31 is further provided with an accommodating groove 317 and a sealing portion 318 in the connecting hole 316. The connecting member 33 has a flange 331 formed on its outer surface and positioned between the accommodating groove 317 and the sealing portion 318. A fastener 34 is disposed in the accommodating groove 317 to abut against the flange 331, and a sealing ring 35 is disposed on the outer surface of the connecting member 33 to abut against the sealing portion 318.

Furthermore, for ease of operation, a first anti-slip portion 22 having patterns is provided on an outer surface of the body 20, and a second anti-slip portion 36 having patterns is provided on an outer surface of the control end 312 of the body portion 31.

As described in the above embodiment, the valve connector 10 enables axial displacement of the control member 30 relative to the body 20 by rotating the control end 312. This axial movement allows the abutting end 311 to push against the valve core VC of the American valve AV to initiate inflation. Once inflation is complete, reverse rotation of the control end 312 causes the abutting end 311 to disengage from the valve core VC. Before the sealing ring 214 detaches from the outer surface of the control member 30, the through hole 21 maintains a high-pressure state to prevent air leakage and allow precise control of air pressure. When the control member 30 moves to the second position, the air inside the through hole 21 is rapidly released, facilitating easy removal of the American valve AV from the internal thread 216.

Figure 6:
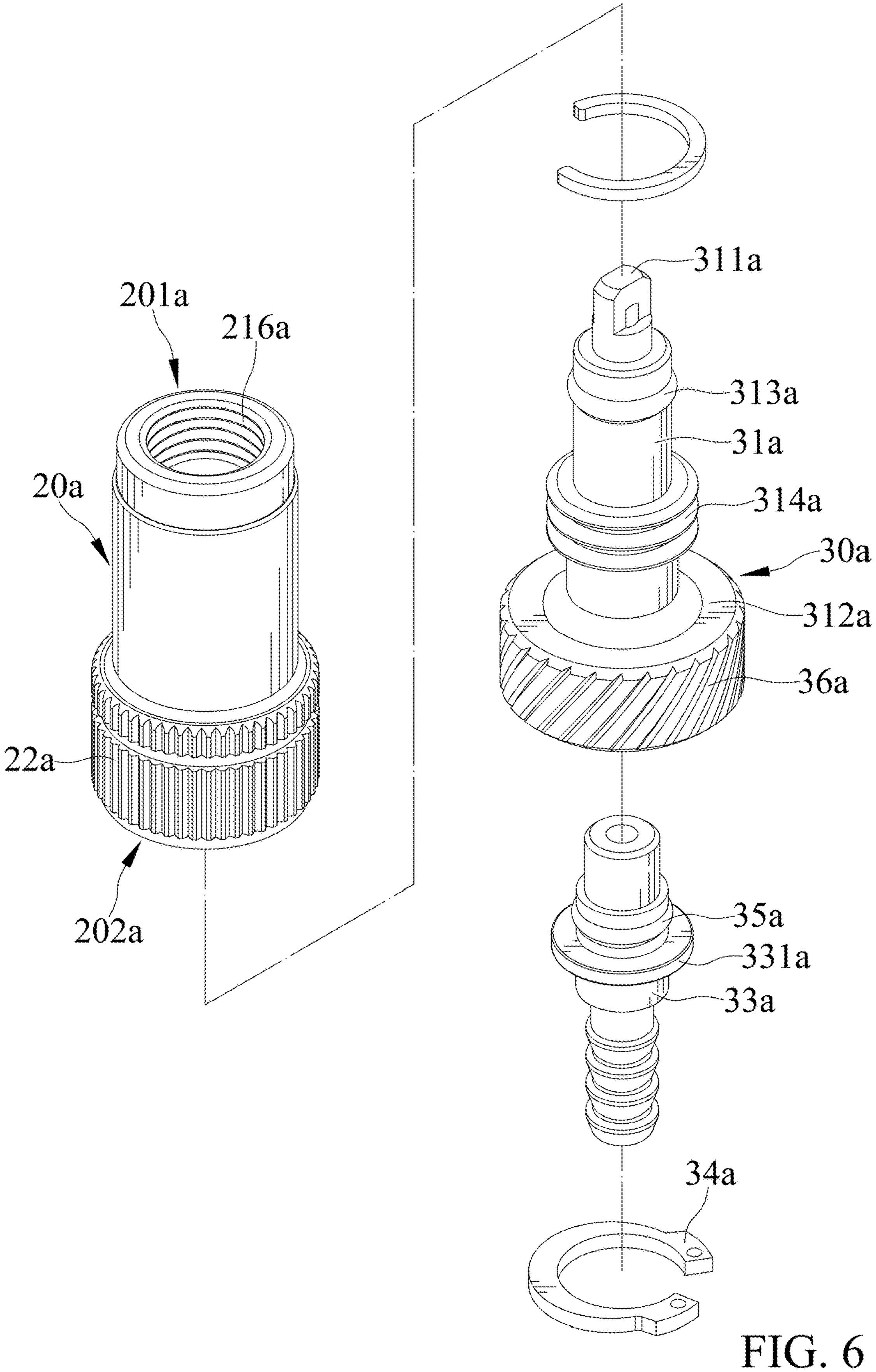
FIG. 6 is an exploded perspective view of a valve connector of a second embodiment according to the present invention.
Figure 7:
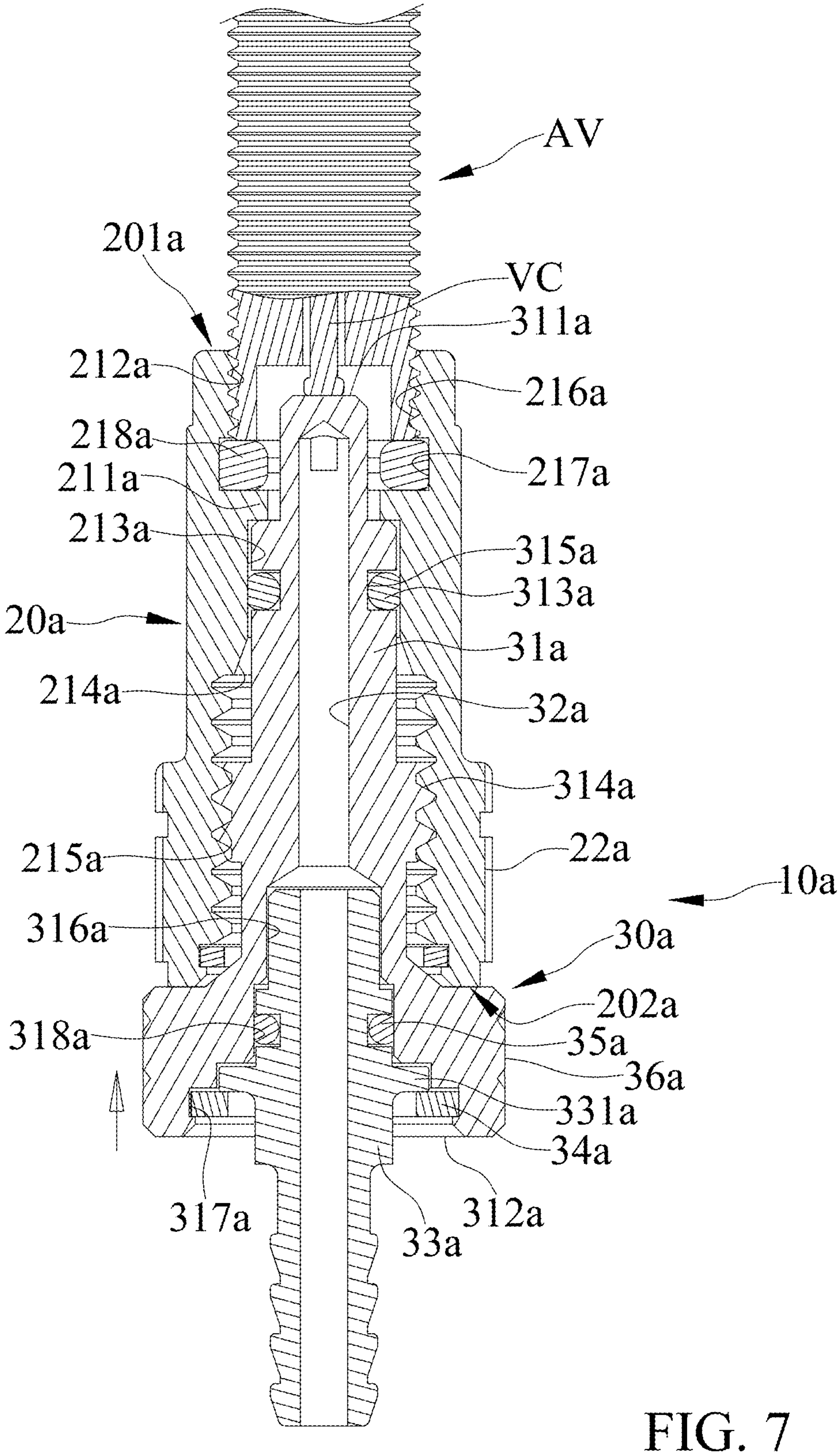
FIG. 7 is a cross-sectional view of the valve connector of FIG. 6, showing a control member in a first position.
Figure 8:
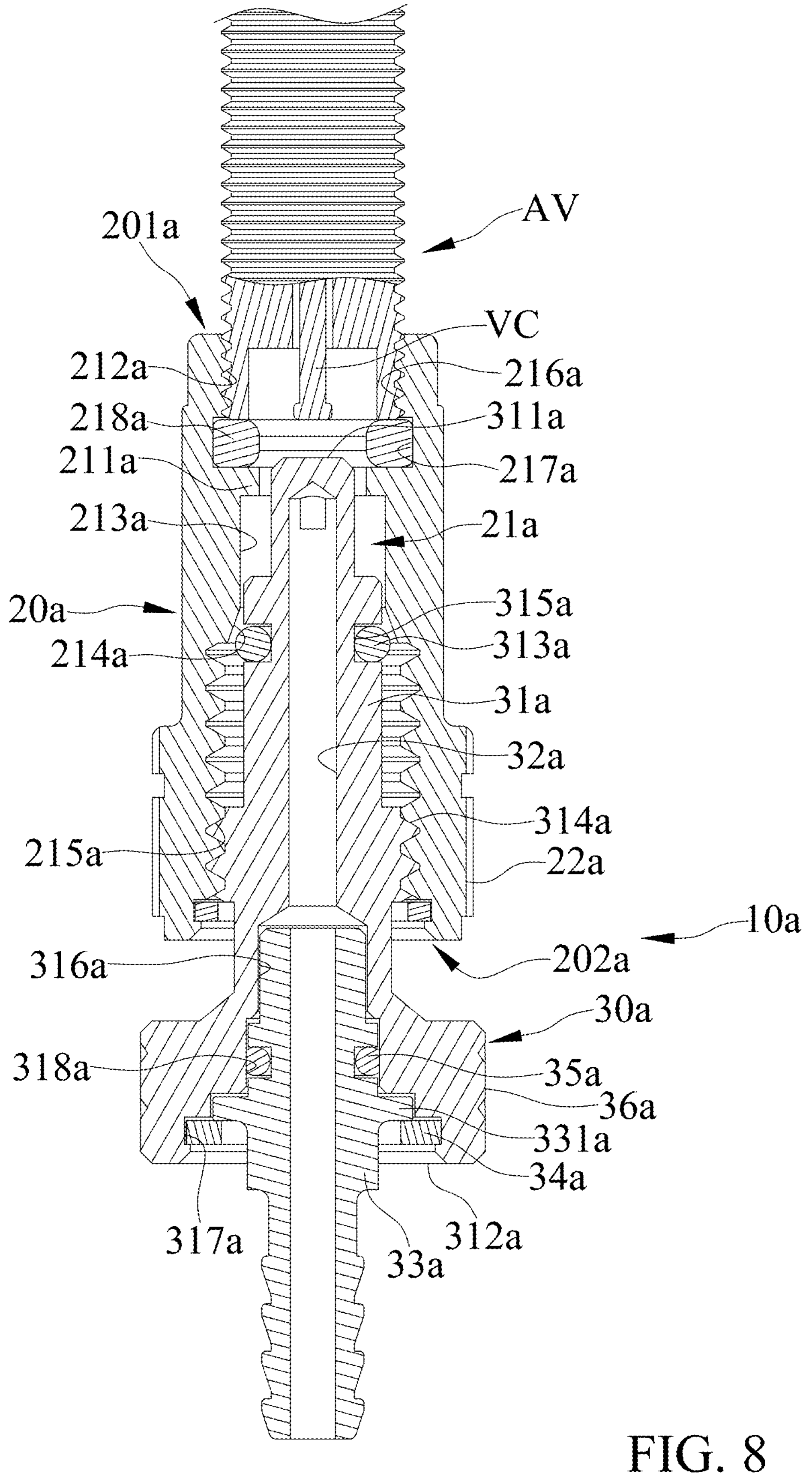
FIG. 8 is a cross-sectional view of the valve connector of FIG. 6, showing the control member in a second position.

Referring to FIGS. 6 to 8, a second embodiment of a valve connector 10*a* is shown in an exploded perspective view and cross-sectional views. The valve connector 10*a* includes a body 20*a* and a control member 30*a* movably disposed relative to the body 20*a*, wherein:

The body 20*a* has a first end 201*a* adapted to attach to an American valve AV, a second end 202*a* opposite to the first end 201*a*, and a through hole 21*a* extending through the first end 201*a* and the second end 202*a*. A shoulder portion 211*a* is formed on an inner surface of the through hole 21*a* to divide the through hole 21*a* into a first accommodating portion 212*a* and a second accommodating portion 213*a*. A venting portion 214*a* is formed on an inner surface of the second accommodating portion 213*a*, wherein the venting portion 214*a* has a first diameter at an end adjacent to the shoulder portion 211*a* less than a second diameter at an end away from the shoulder portion 211*a*.

The control member 30*a* is movable in relation to the body 20 to generate an axial displacement relationship between a first position and a second position. The control member 30*a* includes a body portion 31*a* and a guiding hole 32*a* formed in the body portion 31*a* and communicating with the through hole 21*a*. One end of the body portion 31*a* forms an abutting end 311*a*, and the other end forms a control end 312*a* exposed at the second end 202*a* and adapted to attach to an air pump device (not shown). The guiding hole 32*a* provides an air passage between the abutting end 311*a* and the control end 312*a* and is adapted to communicate the through hole 21*a* with the air pump device. A sealing ring 313*a* is disposed between the abutting end 311*a* and the control end 312*a*.

When the control member 30*a* is in the first position, the sealing ring 313*a* is disposed between the venting portion 214*a* and the second end 202*a* and is separated from the inner surface of the second accommodating portion 213*a*, and the abutting end 311*a* exits the first accommodating portion 212*a*.

When the control member 30*a* is in the second position, the sealing ring 313*a* is disposed between the venting portion 214*a* and the shoulder portion 211*a* and abuts against the inner surface of the second accommodating portion 213*a*. The abutting end 311*a* passes through the shoulder portion 211*a* and enters the first accommodating portion 212*a* to abut against a valve core VC of the American valve AV.

To allow the control member 30*a* to be rotatably disposed within the second end 202*a* and axially displaced relative to the body 20*a*, a first threaded portion 215*a* is formed on the inner surface of the first accommodating portion 212*a*. A second threaded portion 314*a* is formed on the outer surface of the body portion 31*a* and engages the first threaded portion 215*a*, causing the axial displacement of the control member 30*a* when the control end 312*a* is rotated.

To enable the first end 201*a* of the body 20*a* to securely attach to the American valve AV, an internal thread 216*a* is formed on the inner surface of the first accommodating portion 212*a* and is adapted to engage an external thread of the valve body of the American valve AV. An annular groove 217*a* is provided on one side of the first accommodating portion 212*a* adjacent to the shoulder portion 211*a*, wherein a sealing ring 218*a* is disposed in the annular groove 217*a* to abut against the American valve AV and prevent air leakage.

To prevent air leakage from the second end 202*a* of the body 20*a* during inflation, an annular channel 315*a* is formed between the abutting end 311*a* and the control end 312*a* on the body portion 31*a*, and the sealing ring 313*a* is disposed within the annular channel 315*a*.

Additionally, to allow the air pump device to connect to the control end 312*a*, a connecting hole 316*a* is formed at the control end 312*a* and communicates with the guiding hole 32*a*. The connecting hole 316*a* is adapted to receive a connecting member 33*a* configured to attach to a hose of the air pump device. The body portion 31*a* is further provided with an accommodating groove 317*a* and a sealing portion 318*a* in the connecting hole 316*a*. The connecting member 33*a* has a flange 331*a* formed on its outer surface and positioned between the accommodating groove 317*a* and the sealing portion 318*a*. A fastener 34*a* is disposed in the accommodating groove 317*a* to abut against the flange 331*a*, and a sealing ring 35*a* is disposed on the outer surface of the connecting member 33*a* to abut against the sealing portion 318*a*.

Furthermore, for ease of operation, a first anti-slip portion 22*a* having patterns is provided on the outer surface of the body 20*a*, and a second anti-slip portion 36*a* having patterns is provided on the outer surface of the control end 312*a* of the body portion 3*a*.

Figure 9:
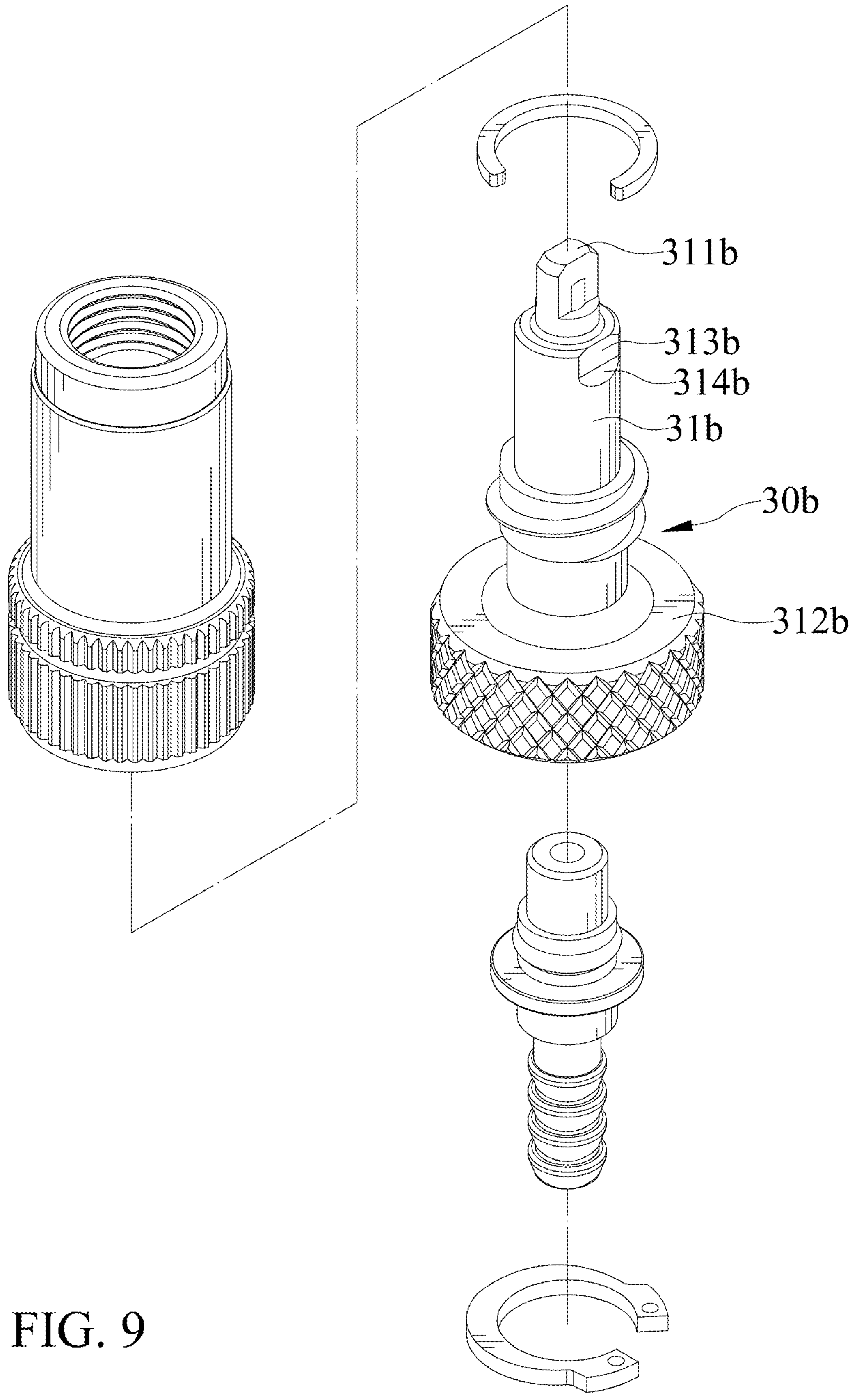
FIG. 9 is an exploded perspective view of a valve connector of a third embodiment according to the present invention.
Figure 10:
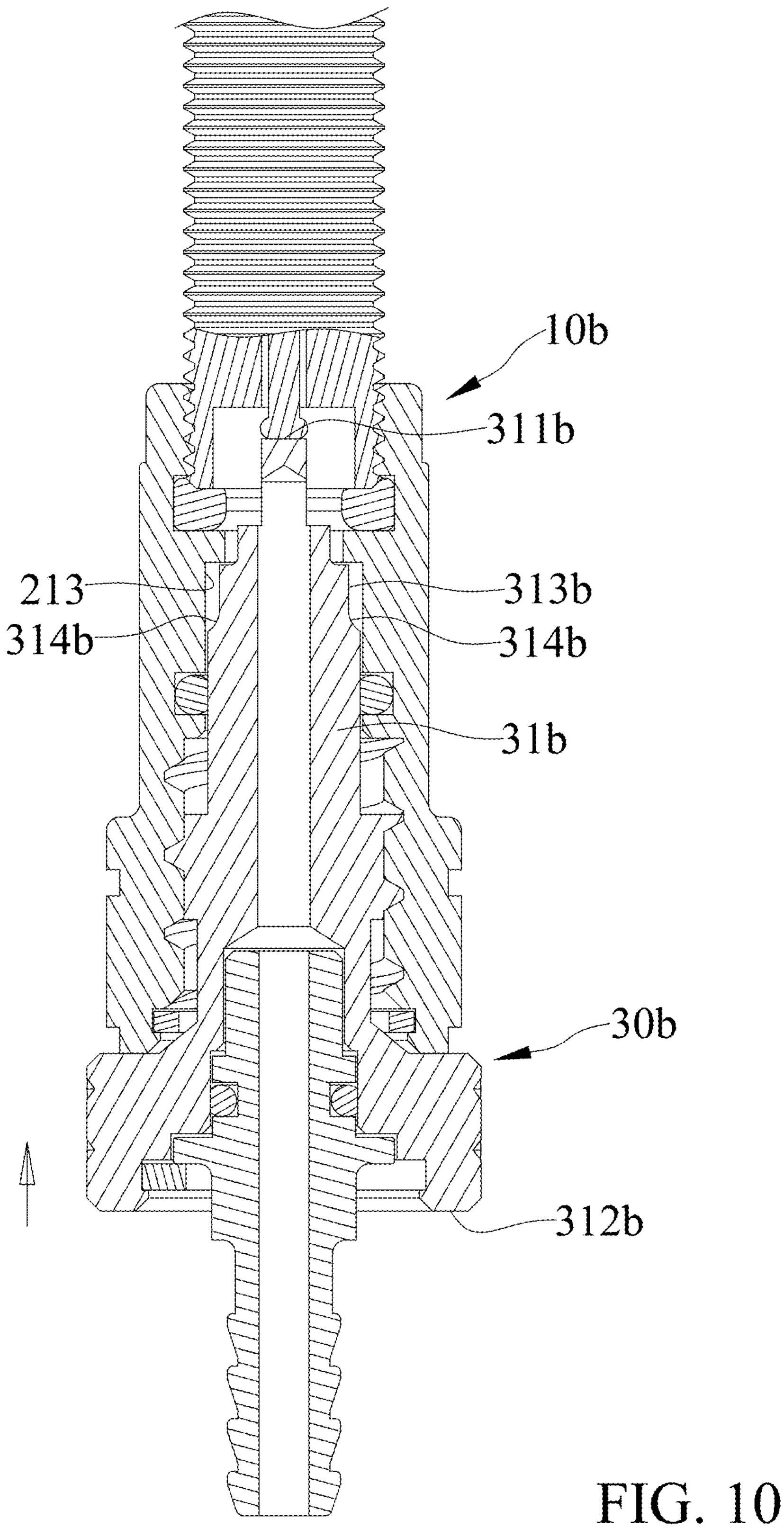
FIG. 10 is a cross-sectional view of the valve connector of FIG. 9, showing a control member in a first position.
Figure 11:
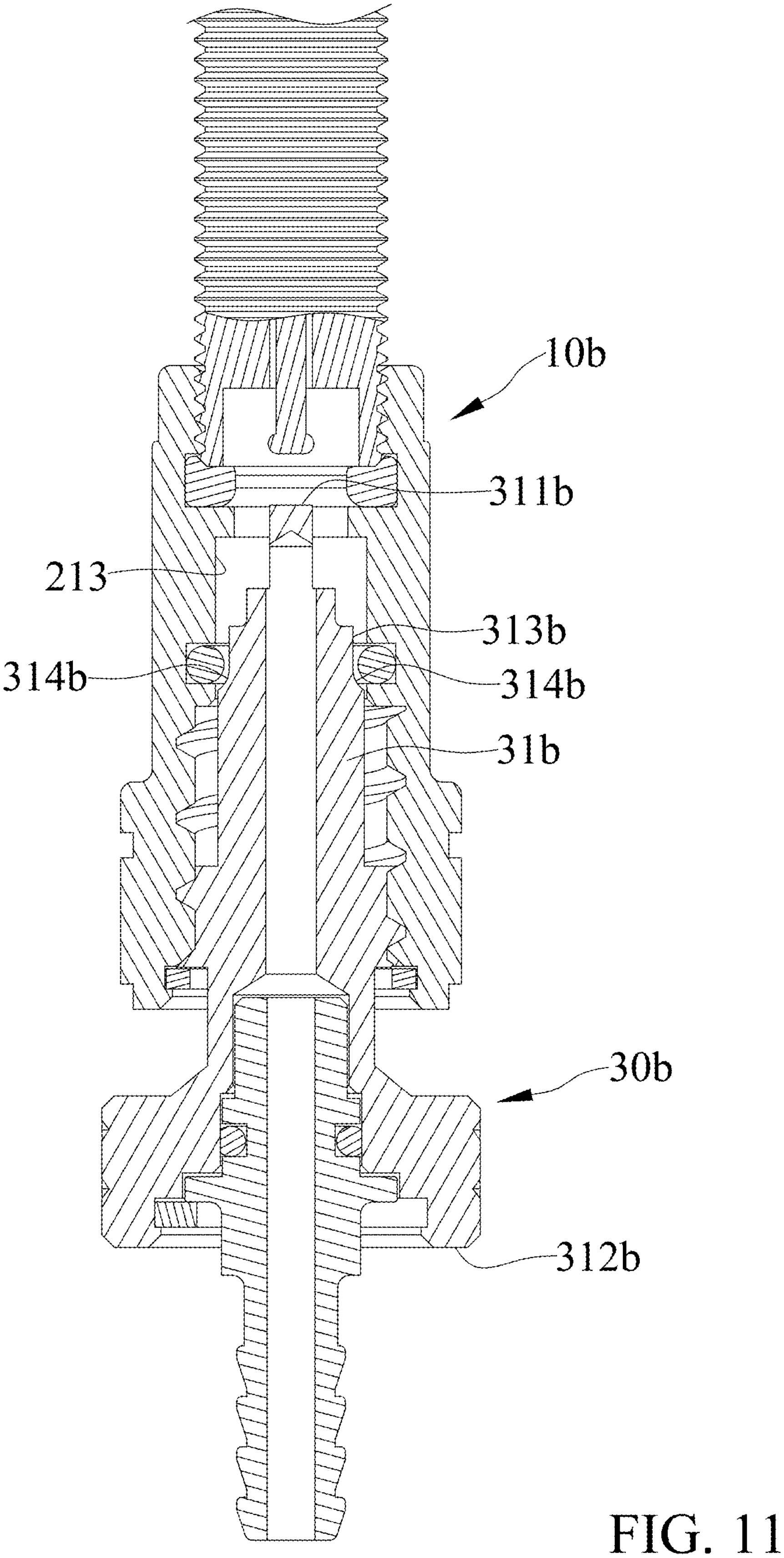
FIG. 11 is a cross-sectional view of the valve connector of FIG. 9, showing the control member in a second position.

Referring to FIGS. 9 to 11, a third embodiment of a valve connector 10*b* is shown in an exploded perspective view and cross-sectional views. The third embodiment is substantially similar to the first embodiment, and therefore, the same reference numbers are used for the same structures. The primary difference is that the valve connector 10*b* includes a venting portion 313*b* that includes at least one venting recess 314*b* formed on an end of the body portion 31*b* adjacent to the abutting end 311. The venting recess 314*b* is spaced from the inner surface of the second accommodating portion 213.

In the embodiment, the venting portion 313*b* may include a pair of venting recesses 314*b* symmetrically formed on opposite sides of the body portion 31*b*. This configuration enhances airflow efficiency while maintaining structural stability. The pair of venting recesses 314*b* create a gap between the body portion 31*b* and the inner surface of the second accommodating portion 213, allowing air to be released more effectively when the control member 30*b* is in the first position.

This structural modification improves the overall inflation and deflation efficiency by ensuring smoother airflow through the venting recesses 314*b*, reducing resistance while maintaining sealing performance in the second position.

Although specific embodiments have been illustrated and described, numerous modifications and variations are still possible without departing from the scope of the invention. The scope of the invention is limited by the accompanying claims.

The invention claimed is:

1. A valve connector, comprising:

a body having a first end adapted to attach to an American valve, a second end opposite to the first end, and a through hole extending through the first end and the second end, wherein a shoulder portion is formed on an inner surface of the through hole to divide the through hole into a first accommodating portion and a second accommodating portion, and wherein a sealing ring is disposed on an inner surface of the second accommodating portion of the through hole; and a control member axially movable in relation to the body between a first position and a second position, wherein the control member includes a body portion and a guiding hole formed in the body portion and communicating with the through hole, wherein one end of the body portion forms an abutting end, and the other end of the body portion forms a control end exposed at the second end and adapted to communicate with an air pump device, wherein the guiding hole provides an air passage between the abutting end and the control end to allow air communication between the through hole and the air pump device, wherein the body portion has a venting portion arranged between the abutting end and the control end, and wherein the venting portion has a first cross-sectional area at an end thereof adjacent to the abutting end less than a second cross-sectional area at an end thereof away from the abutting end;

wherein when the control member is in the first position, the sealing ring is disposed between the venting portion and the control end and abuts against an outer surface of the body portion, the abutting end passes through the annular shoulder and enters the first accommodating portion to abut against a valve core of the American valve;

wherein when the control member is in the second position, the sealing ring is disposed between the venting portion and the abutting end and is separated from the outer surface of the body portion, the abutting end exits the first accommodating portion.

2. The valve connector of claim 1, wherein the through hole has a first threaded portion formed on an inner surface of the first accommodating portion, and wherein the body portion has a second threaded portion formed on the outer surface thereof and engaged with the first threaded portion, causing an axial displacement between the control member and the body when the control end is rotated.

3. The valve connector of claim 1, wherein the through hole has an internal thread formed on an inner surface of the first accommodating portion and adapted to engage with an external thread of the American valve, wherein an annular groove is provided on one side of the first accommodating portion adjacent to the shoulder portion, and wherein a sealing ring is disposed in the annular groove to abut against the American valve.

4. The valve connector of claim 1, wherein the through hole has an annular channel on the inner surface of the second accommodating portion, and wherein the sealing ring is disposed in the annular channel and configured to prevent air leakage from the second end of the body during inflation.

5. The valve connector of claim 1, wherein the body portion has a connecting hole formed at the control end and communicating with the guiding hole, and wherein the connecting hole is adapted to connect with a connecting member configured to attach to a hose of the air pump device.

6. The valve connector of claim 5, wherein the body portion is further provided with an accommodating groove and a sealing portion in the connecting hole, wherein the connecting member is provided with a flange formed on an outer surface thereof and between the accommodating groove and the sealing portion, wherein a fastener is disposed in the accommodating groove to abut against the flange, and wherein a sealing ring is disposed on the outer surface of the connecting member to abut against the sealing portion.

7. The valve connector of claim 1, wherein the body is provided with a first anti-slip portion having patterns on an outer surface thereof, and wherein the control member is provided with a second anti-slip portion having patterns on an outer surface of the control end of the body portion.

8. The valve connector of claim 1, wherein the venting portion is conical, with a first diameter at an end adjacent to the abutting end being smaller than a second diameter at an end away from the abutting end.

9. The valve connector of claim 1, wherein the venting portion includes at least one venting recess formed on the end of the body portion adjacent to the abutting end, and wherein the least one venting recess is spaced from the inner surface of the second accommodating portion.

* * * * *